though such a holder must be suitable not only to supply the required electric voltage to the discharge tube concerned, but also to accommodate measures for cooling the discharge tube by liquid. The exchangeability of the discharge tube in the holder is important, since, when the discharge tube becomes defective, the user of the system comprising such a holder with a discharge tube for example, a film projector, must be able to remove the defective discharge tube and to insert a new discharge tube into the holder instead.

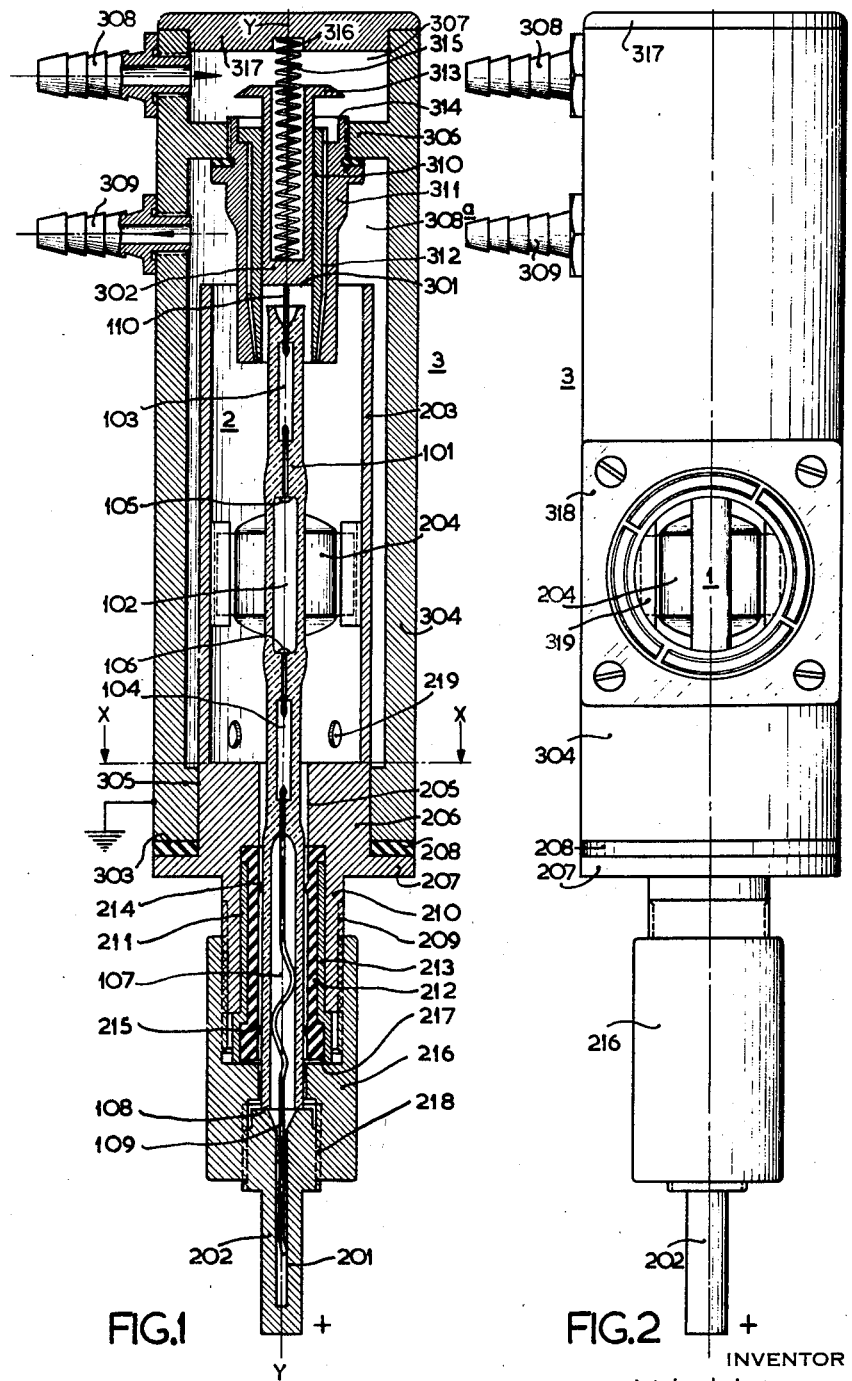

This exchangeability for the user is not provided in a further, known holder, which comprises, in addition, optical means co-operating with the discharge path of the discharge tube. Of the last-mentioned, known device manufacturers furnish an assembly of holders with discharge tubes which, as will be evident, is a fairly costly solution.

The present invention has for for its object to mitigate this disadvantage. A further object is to provide such a structure that, when exchanging the super high-pressure metal-vapour discharge tube, the new tube can be adjusted in an extremely simple manner with respect to the optical means provided in the holder.

The holder with the exchangeable super high-pressure metal-vapour discharge tube set forth has, in accordance with the present invention, the feature that, while the holder comprises optical means co-operating with the discharge path of the discharge tube, the adjustment of the discharge tube relative to the holder takes place in a radial direction by means of a stuffing ring of elastic material, in which one of the ends of the discharge tube fits intimately and which is directly or indirectly held with its outer side in an opening in the holder, whereas the adjustment of the discharge tube in an axial direction takes place with the aid of a member fastened by screwthread on the holder and provided with a stop surface, against which is urged one of the ends of the discharge tube by means of the electric holder contact, which urges resiliently the other end of the discharge tube.

In this holder structure the stuffing ring of elastic material serves, consequently, as a means for the radial orientation of the discharge path with respect to the optical means, while in an axial direction the discharge tube can be adjusted by means of screwthread.

In one embodiment of a holder with a tube according to the invention the stuffing ring surrounds the discharge tube end concerned with a few annular ribs provided in the inner aperture of the ring. On the outer side this stuffing ring is surrounding by a rigid, preferably metallic cylindrical sleeve. This sleeve serves to compensate any deformations of the outer side of the elastic ring, which may be due to the pressure exerted by the discharge tube on the annular ribs on the inner side of the ring aperture.

In a further embodiment of the holder with the tube according to the invention a liquid valve is combined with the resilient holder contact which bears on one of the tube contacts so that only when the lamp is present in the holder, this valve is open and the flow of liquid can circulate. This structure thus permits of exchanging a discharge tube without closing the main conductor of the cooling liquid and without the risk of excessive leakage of the cooling liquid.

The invention will be described more fully with reference to the drawing.

Fig. 1 is a longitudinal sectional view of the discharge tube mounted in the holder, which is arranged in a housing which forms part of the said holder.

Fig. 2 is a view of the said housing, in which the discharge tube arranged in the holder is housed.

In the drawing reference numeral 1 designates the discharge tube. The holder is designated by 2. The housing is designated by 3.

The super high-pressure mercury-vapour discharge tube 1 has a lamp vessel 101 of quartz glass, in which the space 102 constitutes the discharge space. In the pinchings 103 and 104 are arranged the current-supply wires for the cathode 105 and the anode 106. The lamp vessel 101 has at the lower end a tubular extension 107, of which the bottom end surface 108 serves as a stop surface for the axial orientation of the discharge tube with respect to the holder. Beyond this tubular extension 107 projects a current-supply wire 109, the end of which engages an arbitrary area of the inner side of a cavity 201, provided in a pin-shaped current-supply member 202.

Beyond the upper end of the lamp vessel 101 projects the other external current-supply wire 110 of the discharge tube 1, the end of this wire engaging the head surface 301 of a resilient current-supply member 302.

The lamp holder 2, which has the form of a body of revolution about the axis Y—Y mainly below the plane X—X and over this plane mainly the form of a cylindric sheath, supports with the aid of this sheath-like portion 203, a cylindrical mirror 204 (shown diagrammatically), which serves, when the discharge tube is in use, to provide an apparent enlargement of this thickness of the discharge path relative to the optical system (not shown) in the discharge space 102. Since this mirror 204 has a sharply defined shape, the discharge path of the discharge tube must occupy accurately the prescribed position relative to this mirror.

The portion of the holder 2 below the plane X—X consists mainly of a cylindrical part 206, provided with a central bore 205, and terminating at the bottom in a flange 207. With its head surface this flange engages, with the intermediary of the stuffing ring 208, a fitting surface 303 of the outer wall 304 of the housing 3 associated with the holder.

The part 206 of the holder 2 engages at the lower end a sleeve-shaped part 210, the lower part of which is externally provided with screwthread 209. In the cavity 211 in this sleeve-shaped part 210 is accommodated a stuffing ring 212, which is widened at the bottom side. This ring is surrounded by a brass ring 213, the outer diameter of which fits accurately in the bore 211 of the sleeve-shaped part 210. On the inner side the stuffing ring 212 is provided with two circular ribs 214 and 215, which intimately surround the tubular extension 107 of the discharge tube 1. Onto the screwthread 209 of the sleeve-shaped part 210 is screwed a member 216, shaped in the form of a cap nut. This member has a contact surface 217, with the aid of which, when the nut is tightened, the thickened part of the stuffing ring 212 is compressed between this surface and the lower side of the sleeve-shaped part 210 of the holder. At the lower end of this member 216 is fastened the aforesaid contact pin 202 by means of screwthread 218, so that, when the cap nut 216 is tightened, the contact pin 202 can still be moved out of and into the cap nut.

The housing 3 associated with the holder 2 is provided at the bottom end with a cylindrical fitting surface 305, in which fits very accurately the outer side of the part 206 of the holder. The housing 3 is provided near its top end with a transverse wall 306, in which is provided the liquid valve, which will be described hereinafter and which is combined with the current-supply contact. Over this partition 306 is located, in the housing a space 307, to which cooling liquid can be supplied through the connecting nipple 308. When the cooling liquid leaves the space 307 via the said valve and when it has performed its cooling function in the space 308a in the housing 3, the coolant leaves the space 308a through the nipple 309. In the partition 306 is provided a stationary part, which consists mainly of two sheaths 310 and 311, one of which surrounds the other. Between these sheaths a narrow gap 312 is left, which is orientated downwardly to the axis Y—Y. In the bore of the sheath 310 the current-supply member 302 is movable. This current-supply member is provided at the top end with a flange 313, the outer edge of which fits accurately on the circular upper edge 314 of the sheath 311. Thus the flange 313 operates as a valve and the rim 314 as a valve seat. The current-supply member 302 is internally hollow and contains a helical spring 315, the top end of which engages a suitable cavity 316 of the top seal 317 of the housing 3.

As is particularly evident from Fig. 2, a flange 318 is provided on the housing 3, this flange having a central opening. A closing window 319 is fastened therein in a liquid-tight manner, this window permitting light to emanate from the housing.

The electrical connections of this discharge tube may be such that the contact pin 202 is connected to the positive terminal, whereas thet housing 3 is connected to earth.

When the discharge tube is in use, when the position of the discharge tube relative to the holder and the housing is that shown in Figs. 1 and 2, the discharge path 102 is accurately centered relatively to the mirror 204. The coolant, which enters the housing through the nipple 308, flows through the space 307 and the gap 312 into the space 308a. Since the gap 312 contracts towards the end, the discharge tube is cooled strongly and efficiently by the incoming cooling water, which is subsequently conveyed out of the space partly surrounded by the sheath 203 through the openings 219. The coolant leaves the space 308a through the nipple 309.

If the super high-pressure mercury-vapour discharge tube 1 becomes defective, the holder can be withdrawn from the housing 3, so that the cylindrical part 206 is removed out of the bore 305. Since the pressure exerted on the head surface 301 of the current-supply member 302 falls out, the spring 315 is detended and the valve 313 is pressed down on the valve seat 314. The only leakage of liquid occurring is that owing to the emptying of the space 308a. Then the nut 216 can be unscrewed and the defective discharge tube together with the stuffing ring 212 can be removed from the holder. Then a new tube is introduced into the stuffing ring, which is inserted with the tube into the holder and owing to the effect of the stuffing ring the prescribed position of the discharge tube in a radial direction relative to the mirror 204 is directly obtained. The holder is then introduced into the housing. The correct adjustment in an axial direction of the discharge tube relative to the mirror 204 is obtained by adjusting the contact pin 202 by means of the screwthread 218 relatively to the cap nut 216. When the new discharge tube is inserted, the pressure exerted by the current-supply wire 110 on the contact member 302 lifts the valve 313 from the seat 314.

What is claimed is:

1. A holder for an exchangeable, liquid-cooled super high-pressure metal-vapour discharge tube, which is surrounded by a space in the holder and which is arranged in the holder in an axially resilient contact device, comprising optical means co-operating with the discharge path of the discharge tube, means to adjust the discharge tube relative to the holder in a radial direction including a stuffing ring of elastic material, in which one of the ends of the discharge tube fits intimately and which is adapted to be accommodated with its outer side in an opening in the holder, means to adjust the discharge tube in an axial direction including a member fastened to the holder by screwthread, said member being provided with a stop surface against which one of the ends of the discharge tube is urged by the electric holder contact pressing the other end of the discharge tube in a resilient manner.

2. A holder for a tube as claimed in claim 1, in which the stuffing ring has a plurality of annular ribs, provided on the inner side of the ring opening, said stuffing ring being surrounded on the outer side by a rigid cylindrical sleeve.

3. A holder for a tube as claimed in claim 1, in which the resilient holder contact urging one of the tube contacts is combined with a liquid valve so that, only when the lamp is present in the holder, this valve is open and the flow of coolant can circulate.

4. A holder as claimed in claim 2 in which the cylindrical sleeve is metallic.

References Cited in the file of this patent

UNITED STATES PATENTS

| | | |
|---|---|---|
| 2,673,940 | Slifkin | Mar. 30, 1954 |
| 2,682,006 | Ferrari | June 22, 1954 |
| 2,906,901 | Wilde | Sept. 29, 1959 |